United States Patent [19]
Thomas et al.

[11] Patent Number: 6,030,654
[45] Date of Patent: Feb. 29, 2000

[54] COMPOSITION FOR NO FAT OF REDUCED FAT BAKERY PRODUCTS

[75] Inventors: Mary E. Thomas, Robbinsville; M. Stephen Lajoie, Basking Ridge; Robin C. Sargent, Burlington Township; Deborah Geeding-Schild, Robbinsville, all of N.J.

[73] Assignee: Church & Dwight Co., Inc., Princeton, N.J.

[21] Appl. No.: 09/066,630

[22] Filed: Apr. 24, 1998

Related U.S. Application Data

[63] Continuation-in-part of application No. 08/712,445, Sep. 11, 1996, abandoned.

[51] Int. Cl.⁷ ............................................ A21D 2/02
[52] U.S. Cl. ........................ 426/549; 426/551; 426/552; 426/553; 426/554; 426/561; 426/562; 426/804
[58] Field of Search .................... 426/561, 552, 426/553, 554, 555, 549, 562, 804, 551

[56] References Cited

U.S. PATENT DOCUMENTS

| | | | |
|---|---|---|---|
| 3,773,521 | 11/1973 | Tsen et al. | 426/343 |
| 4,109,025 | 8/1978 | Lauck | 426/551 |
| 4,396,635 | 8/1983 | Roudebush | 426/561 |
| 4,404,227 | 9/1983 | Pomper | 426/555 |
| 4,503,083 | 3/1985 | Glicksman | 426/555 |
| 4,515,824 | 5/1985 | Blake | 426/555 |
| 4,526,799 | 7/1985 | Glicksman | 426/555 |
| 4,900,577 | 2/1990 | Arciszewski | 426/562 |
| 4,966,782 | 10/1990 | Hadolph | 426/562 |
| 5,153,018 | 10/1992 | Lajoie | 426/562 |
| 5,225,225 | 7/1993 | Thomas | 426/561 |
| 5,225,226 | 7/1993 | Thomas | 426/561 |
| 5,262,187 | 11/1993 | Hahn | 426/554 |
| 5,413,804 | 5/1995 | Rhodes | 426/804 |
| 5,512,311 | 4/1996 | Capitani | 426/804 |
| 5,554,404 | 9/1996 | Chung | 426/561 |

OTHER PUBLICATIONS

Frazer 1958 Food Microbiology McGraw–Hill Book Co. New York p. 5–7.

A. Abboud, "Systems Approach to Reducing Fat in Baked Goods", AIB(American Institute of Baking) Research Dept. Technical Bulletin, vol. XVII, Issue 12, Dec. 1995, pp. 1–6.

B.S. Kamel, "Surfactants in Bakery Foods", AIB(American Institute of Baking), Research Dept. Technical Bulletin, vol. XV, Issue 7, Jul. 1993, pp. 1–12.

A. Davis, "Water Activity–New Interest in an Old Concept", AIB(American Institute of Baking)Research Dept. Technical Bulletin, vol. II, Issue 3, Mar. 1980, pp. 1–4.

W.C. Frazier, *Food Microbiology*, 2nd Ed. (New York McGraw Hill, 1967) 5–7.

*Primary Examiner*—Carolyn Paden
*Attorney, Agent, or Firm*—Irving Fishman

[57] ABSTRACT

Chemically leavened baking compositions, i.e., batters and doughs, intended for the production of no fat or reduced fat bakery products which comprise flour; no more than about 15 wt. % of the unbaked composition of shortening; a total water content such that the water activity of the unbaked composition ($a_w$) at room temperature is in the range of about 0.70 to about 0.95; and as a leavening agent, sodium bicarbonate (SBC) having a particle size distribution such that about 15 to about 50 wt. % of the particles have a particle size less than about 105 microns (U.S. Mesh Size 140) and about 30 to about 65 wt. % of the particles have a particle size greater than about 149 microns (U.S. Mesh Size 100). Preferably the composition also contains at least one fat replacer, the total fat replacer being in an amount of at least about 0.10 wt. % of the unbaked composition.

23 Claims, No Drawings

COMPOSITION FOR NO FAT OF REDUCED FAT BAKERY PRODUCTS

CROSS-REFERENCE TO RELATED APPLICATION

This application is a continuation-in-part of application Ser. No. 08/712,445, filed Sep. 11, 1996 now abandoned.

STATEMENT REGARDING FEDERALLY SPONSORED RESEARCH OR DEVELOPMENT

Not applicable.

BACKGROUND OF THE INVENTION

1. Field of the Invention

This invention relates to no fat or reduced fat baking compositions containing sodium bicarbonate as a leavening agent.

2. Background Information Including Description of Related Art

Because of health considerations, there has been increased emphasis in recent years on the consumption of food products having reduced fat content. This has been a particularly troublesome problem in the case of many bakery products, (e.g., cakes, cookies, crackers, muffins, breads, pastries, etc.) wherein the role of shortening, an edible fat or oil, is crucial in obtaining a baked product having a desirable texture, appearance, and taste. In this regard, the interaction of the shortening, leavening agent, e.g. sodium bicarbonate or baking soda, and water in the baking composition, i.e., the batter or baking dough, appears to be significant in obtaining the aforementioned desirable properties of the baked product.

Various fat replacers have been developed which have been substituted for all or part of the shortening in baking compositions, such as hydrolyzed starches, e.g., dextrins and maltodextrins, pectins, concentrated undenatured and non-oxidized proteins, natural gums, edible emulsifiers such as mono- and diglycerides, stearoyl lactylate salts, and mixtures of these substances. It has been found however that the use of these substances to replace all or part of the shortening in baking compositions used to produce bakery products, many of which contain sodium bicarbonate as a chemical leavening agent, increases the difficulty of mixing the composition and may result in baked products somewhat deficient in structure, appearance and/or flavor. Thus, any modification of no fat or reduced fat baking compositions used to produce bakery products which eliminates or reduces the foregoing deficiencies in processing and properties, is very desirable.

The following prior art references may be considered relevant or material to the invention claimed herein.

U.S. Pat. No. 3,773,521, issued Nov. 20, 1973 to Tsen et al., discloses a method of decreasing or eliminating the shortening required in yeast or chemically leavened baked products by incorporating in the dough or batter, in lieu of the shortening omitted, from 0.1 to 3% based on the weight of the flour content of the dough or batter, of a sodium or calcium salt of an acyl lactylate of a $C_{14}$–$C_{22}$ fatty acid. The entire disclosure of this patent is incorporated herein by reference.

U.S. Pat. No. 4,109,025, issued Aug. 22, 1978 to Lauck, discloses leavened baked goods, particularly high protein, low fat biscuits, in which the leavening agent is sodium bicarbonate and a leavening acid, and the shortening is at least partially replaced by a whey protein concentrate in which the protein is substantially undenatured and non-oxidized. The entire disclosure of this patent is incorporated herein by reference.

U.S. Pat. No. 4,396,635, issued Aug. 2, 1983 to Roudebush et. al., discloses a microwave cake mix containing sugar, flour, any of various additives considered to be fat replacers, and a chemical leavening agent which may comprise sodium bicarbonate. There is no disclosure of any particle size distribution of the chemical leavening system.

U.S. Pat. No. 5,153,018, issued Oct. 6, 1992 to Lajoie et. al., teaches a chemical leavening system intended for baked goods, which may comprise sodium bicarbonate (SBC). The SBC has a particle size within the range of about 25 to 250, preferably about 30 to 210 microns. Example II of the patent shows the use of SBC having an average particle size of about 95 microns, with the particles being within the range of about 45 to 150 microns.

A. Abboud, "Systems Approach to Reducing Fat in Baked Goods", AIB (American Institute of Baking) Research Department Technical Bulletin, Vol. XVII, Issue 12, December 1995, pages 1–4, discusses the use of fat replacers in general contemplated for use in this invention, while edible emulsifiers in particular, suitable as fat replacers, are discussed in B. S. Kamel, "Surfactants in Bakery Foods" AIB (American Institute of Baking) Technical Bulletin, Vol. XV, Issue 7, July 1993, Pages 1–12. The entire disclosures of both these articles are incorporated herein by reference.

A. Davis, "Water Activity—New Interest in an Old Concept", AIB (American Institute of Baking) Technical Bulletin, Vol. II, Issue 3, March 1980, pages 1–4, has a detailed discussion of the property of water activity as applied to foods. The entire disclosure of this reference is incorporated herein by reference.

W. C. Frazier, Food Microbiology, 2nd Ed. (New York, McGraw Hill, 1967) 5–7, contains a definition and discussion of water activity ($a_W$) of foods, particularly as it relates to the growth of microorganisms.

BRIEF SUMMARY OF THE INVENTION

In accordance with this invention, no fat or reduced fat baking compositions, i.e., batters and doughs, intended for the production of bakery products, especially cookies, cakes, crackers and pastries, using chemical leavening, are provided which comprise flour; an amount of shortening which is at least 25% reduced from a full fat analogue of the baking composition involved, i.e., used to produce bakery products, especially cookies, cakes, crackers and pastries, which reduced amount is generally no more than about 15 wt. % of the total unbaked product; a total water content such that the water activity ($a_W$) of the unbaked product is in the range of about 0.70 to about 0.95 at room temperature; and as a leavening agent, sodium bicarbonate having a particle size distribution such that about 15 to about 50 wt. % of the particles have a size less than about 105 microns (U.S. Mesh Size 140) and about 30 to about 65 wt. % of the particles have a particle size greater than about 149 microns (U.S. Mesh Size 100). Preferably the composition also contains one or more fat replacers which define an art-recognized group of materials capable of imparting to baked goods many of the desirable properties contributed by shortenings but without their bioavailable fatty acid content, the total fat replacer, when used, usually being in an amount of at least about 0.10 wt. % of the total unbaked product.

The composition may also optionally contain other ingredients commonly present in baking compositions intended for the production of bakery products for the purpose of improving their properties, including but not limited to sugars, artificial sweeteners such as saccharin or aspartame, salt, flavoring and egg.

The baking compositions of this invention can be used to prepare bakery products having no fat or reduced fat content while still maintaining high standards of taste, texture, and appearance.

BRIEF DESCRIPTION OF THE SEVERAL VIEWS OF THE DRAWINGS

Not applicable.

DETAILED DESCRIPTION OF THE INVENTION

The flour in the baking compositions of this invention is usually a bolted or unbolted wheat flour but also may be a flour of another cereal grain such as rye, oats or corn, or a flour of other edible high starch plants such as potato. The flour may be present in an amount in the range, for example, of about 15 to about 75 wt. %, preferably about 20 to about 50 wt. % of the unbaked composition.

As stated, the baking compositions of this invention may be substantially free of any fat or shortening. However, a reduced amount of shortening may be present, e.g. in an amount no greater than about 15 wt. % of the unbaked composition, usually at least about 1 wt. % of the unbaked composition when used, and often about 5 to about 12 wt. % of the unbaked composition. If less than about 1 wt. % of shortening is present in the unbaked composition, a fat replacer is generally employed. As well-known in the art, the shortening may be a fat or oil solid at room temperature, e.g. tallow, lard, coconut oil or a hydrogenated vegetable oil, or, particularly if used in lower amounts, an unhydrogenated vegetable oil liquid at room temperature such as corn, cottonseed, soybean, peanut or olive oil.

The water activity ($a_W$) of food products such as the baking compositions of the present invention, is widely used in the art and is a measure of the free moisture in the product. It is defined as the quotient of the water vapor pressure of the composition divided by the vapor pressure of pure water at the same temperature. The water activity of the unbaked compositions of the invention at room temperature is in the range, for example, of about 0.70 to about 0.95, preferably about 0.75 to about 0.85. These ranges correspond approximately to a range of total water content of about 5 to about 45 wt. %, preferably about 10 to about 20 wt. % of the unbaked composition. The total water content includes free water present in and/or hygroscopically associated with the other ingredients, as well as added free water. The property of water activity as applied to foods is discussed in detail in the previously cited article of A. Davis, the entire disclosure of which is incorporated herein by reference.

The sodium bicarbonate (SBC) leavening agent used in the baking composition of the invention has a particle size distribution such that about 15 to about 50 wt. %, preferably about 20 to about 40 wt. %, and most preferably about 25 to about 35% of the particles have a size less than about 105 microns (U.S. Mesh Size 140), and about 30 to about 65 wt. %, preferably about 48 to about 60 wt. %, and most preferably about 50 to about 55 wt. % of the particles have a particle size greater than about 149 microns (U.S. Mesh Size 100). In addition, the SBC leavening agent used in the invention has typically less than about 32% of its particles between about 105 microns (U.S. Mesh Size 140) and about 149 microns (U.S. Mesh Size 100). In a most preferred embodiment, the SBC of the invention has from about 22 to about 32 wt. % of its particles in the range of from about 105 microns to about 149 microns. Finally, the SBC of the invention will, in many cases, contain from about 5 to about 10 wt. % of particles smaller than about 44 microns (U.S. Standard Sieve Series No. 325) and about 25 to about 40 wt. % of particles larger than about 177 microns (U.S. Standard Sieve Series No. 80), with the average particle size of the SBC being in the range, for example of from about 130 to about 170 microns.

The foregoing particle size distribution of the SBC employed in the composition of this invention is not used in any commercial grade of sodium bicarbonate. However it can be obtained by blending from about 10 to about 50 wt. % of commercial grade powdered SBC in which about 90 wt. % of the particles have a particle size less than about 105 microns (U.S. Standard Sieve Series No. 140), about 0.2 wt. % of the particles have a particle size greater than about 149 microns (U.S. Standard Sieve Series No. 100), and the average particle size is in the range, for example, of about 65 to about 75 microns, with from about 50 to about 90 wt. % of commercial grade coarse granular SBC in which about 8 wt. % of particles have a particle size less than about 105 microns (U.S. Standard Sieve Series No. 140), about 75 wt. % of the particles have a particle size greater than 149 microns (U.S. Standard Sieve Series No. 100), and the average particle size is in the range, for example, of about 175 to about 185 microns. The SBC may be present in an amount, for example, of about 0.1 to about 2 wt. %, preferably about 0.3 to about 1.0 wt. % of the unbaked composition. Leavening acids are generally used with SBC in the production of cakes and sometimes in the production of cookies and crackers. Levels of usage will vary based on the level of SBC and the type of leavening acid employed. Typical leavening acids include cream of tartar (potassium bitartrate), monocalcium phosphate (MCP), sodium aluminum phosphate (SALP), sodium acid pyrophosphate (SAPP), and sodium aluminum sulfate (SAS), separately or in combination with each other.

The fat replacer optionally present in the baking compositions of the invention may be any of various kinds known in the art, such as a hydrolyzed starch, e.g., an acid-, enzyme-, or heat-hydrolyzed starch such as a dextrin or a maltodextrin, e.g. oat or potato maltodextrin, and which may comprise degraded starch crystallites; an undenatured and non-oxidized protein concentrate, such as a whey concentrate, e.g., as disclosed in previously cited U.S. Pat. No. 4,109,025, or calcium or sodium caseinate; a hydrocolloid, e.g., a natural gum such as carrageenan or guar; a pectin such as a citrus peel or apple pectin; an edible emulsifying agent such as a mono- or diglyceride of a $C_{12}$–$C_{22}$ fatty acid; a derivative of such a mono- or diglyceride, e.g., a lactic acid ester of such a mono- or diglyceride, lecithin, an ethoxylated monoglyceride blend (EOM), a succinylated monoglyceride, a distilled acetylated monoglyceride, or a tartaric acid ester of mono- or diglyceride (DATEM); or an ester of at least one $C_{12}$–$C_{22}$ fatty acid with a hydroxyorgano compound other than glycerol, e.g., a sodium or calcium stearoyl lactylate of a $C_{14}$–$C_{22}$ fatty acid as disclosed in previously cited U.S. Pat. No. 3,773,521, a sorbitan ester, a polysorbate, propylene glycol monostearate (PGMS), or a polyglycerol ester (PGE); a microparticulate such as microcrystalline cellulose or microparticulated protein; a hemicellulose such as a pentosan or beta-glucan; a degraded cellulose; a partially water soluble or swellable cellulose ether such as carboxymethyl cellulose or methyl cellulose; a structured (manmade) fat having a substantially lower caloric value than conventional fats and oils, such as a triglyceride ester of a combination of short-, medium- and long-chain fatty acids, e.g., a triglyceride of caprylic, capric and behenic acids sold as "Caprenin"; a non-caloric synthetic fat such as a sucrose ester of long chain fatty acids sold as "Olestra"; or a mixture of any of the foregoing fat replacers. Fat replacers in general are discussed in some detail in the previously cited article by A. Abboud, and edible emulsifiers in particular are discussed in the previously cited article of B. S. Kamel, with both of these articles, as stated, being incorporated herein by reference. The fat replacer may be present in an amount, for example, of about 0.10 to about 10 wt. %, preferably about 0.5 to about 5 wt. %, of the unbaked composition.

To maintain a desirable level of sweetness in the baked product, a sugar such as sucrose, glucose, fructose or a mixture of sugars such as invert sugar, or an artificial sweetener such as saccharin or aspartame is usually included in the composition. If sugar is used, it will generally be in the range, for example, of about 10 to about 40 wt. % of the unbaked composition.

Egg is often included in the composition to improve its taste, appearance and texture. If egg is present, it will often be in an amount, for example, of about 5 to about 20 wt. % of the unbaked composition.

Small amounts of other conventional ingredients such as salt, non-fat dry milk (NFDM), and flavoring, may also be included in the composition, as is conventional in the art.

The baking compositions of this invention allow for the production of no fat or reduced fat bakery products having a high standard of properties, e.g., superior texture, grain structure, cell structure and volume index, as compared with properties obtained when a commercial grade of SBC having a standard particle size distribution is used as the chemical leavener.

The following examples further illustrate the invention.

EXAMPLES 1 to 4 AND COMPARATIVE EXAMPLES A TO D

In these examples, cookies were prepared using the formula for cookie doughs based on that developed by the Kansas State University (KSU) Department of Foods and Nutrition, as discussed in Cereal Chemistry 71 (4): 344,351, and shown in Table I.

TABLE I

Kansas State University Cookie Formula

| Ingredient | Weight Percent |
| --- | --- |
| All Purpose Flour | 32.64 |
| Brown Sugar | 16.31 |
| Granulated Sugar | 16.31 |
| Salt | 0.66 |
| Sodium Bicarbonate | 0.66 |
| Vanilla | 0.66 |
| Eggs | 10.88 |
| Water | 12.33 |
| Shortening | 5.44 |
| Fat Replacer | 4.11 |

This formula is intended for the production of chocolate chip cookies but without the chocolate chips. In Examples 1–4, the sodium bicarbonate was prepared by blending about 25 wt. % of commercial grade powdered SBC having a particle size distribution as previously described and an average particle size of about 70 microns, and about 75 wt. % of commercial grade coarse granular SBC having a particle size distribution as previously described and an average particle size of about 180 microns, such that the particle size distribution of the blended SBC was within this invention, with about 30 wt. % of the particles in the blend being less than about 105 microns (U.S. Standard Sieve Series No. 140), of which about 5 to about 10 wt. % of the total blend was less than about 44 microns (U.S. Standard Sieve Series No. 325), about 50 wt. % of the particles in the blend being greater than about 149 microns (U.S. Standard Sieve Series No. 100), of which about 35 wt. % of the total blend was greater than about 177 microns (U.S. Standard Sieve Series No. 80), about 20 wt. % of the particles in the blend being in the range of from about 105 to about 149 microns, and the average particle size of the blended SBC being about 150 microns, while in Comparative Examples A–D the SBC was the commercial powdered grade, which is the standard used in the baking industry. The particle size distributions were determined by sieve analysis similar to ASTM D502-89 using a Tyler Ro-Tap, USA Standard Testing Sieves, and a pan and cover 8 inches in diameter and one inch high. Different fat replacers were used in the examples as follows:

In Example 1 and Comparative Example A, the fat replacer was an acid-hydrolyzed corn starch sold as "STELLAR" by A. E. Staley manufacturing Co., which has a primary chemical structure of a branched amylopectin comprised of anhydro-D-glucopyranose units linked $\alpha$-1,4 in linear regions and $\alpha$- 1,6 at branch points, and in which approximately 70% is water-insoluble and consists of microcrystallites having a weight average molecular weight of under 20,000.

In Example 2 and Comparative Example B, the fat replacer comprised primarily potato maltodextrin sold as "PASELLI SA2" by AVEBE America Inc., which is an enzyme-hydrolyzed potato starch having a DE (dextrose equivalent) below 5.

In Example 3 and Comparative Example C, the fat replacer was a citrus peel pectin sold as "Slendid" by Hercules Co.

In Example 4 and Comparative Example D, the fat replacer was a whey protein containing as edible emulsifiers mono- and diglycerides, lactic acid ester of mono- and diglycerides, and lecithin, which fat replacer is sold as "Simplesse" by NutraSweet/Kelco.

All the cookie doughs and cookies of these examples were prepared as follows.

To a 5 quart Hobart mixer, equipped with paddle, the shortening, eggs, water and vanilla were mixed at speed 2 (medium) for one minute. The remaining dry ingredients were added and mixed at speed 1 (low) for 30 seconds. The dough was then mixed at speed 2 (medium) for 1 minute.

Since the eggs have a water content of about 75% and the vanilla flavoring contributed about 0.5% of water to the dough, the dough had a total water content of 12.33% of free water plus 8.16% of water in the egg plus 0.5% of water in the flavoring, or a total of 20.99 wt. % of water. The water activity ($a_W$) of the doughs of Examples 3 and Comparative Example C utilizing "Slendid" fat replacer was 0.78–0.82, while that of Example 4 and Comparative Example D utilizing SIMPLESSE fat replacer was 0.77–0.80, both determined with a Hygroline "Thermoconstant" Test Chamber, Series HTC, manufactured by Rosemount Analytical. All the other examples had an $a_W$ of 0.75–0.85.

The dough of each example was measured out using a #70 scoop and deposited onto a cookie tray, each portion of dough being 2 inches apart and baked at 375° F. for 10 minutes. The cookies each had a baked weight of about 19 grams.

The cookies of the examples were graded for texture using a scorecard which was adapted from the AACC (American Association of Cereal Chemists) Method 10-90, with the unit of measure being on a scale of 0 to 7, the numbers indicating the following texture qualities: 1 (wet), 3 (chewy), 5 (crumbly) and 7 (tender). Higher numerical grades were deemed to indicate better texture than lower grades.

The cookies were also graded for grain structure using AACC Method 10-90 modified for cookie flour, with the unit of measurement on a scale of 1 to 7 and with the numbers indicating the following grain qualities: 1 (dense), 3 (slightly open), 5 (open) and 7 (fine). Cookies with higher grades were deemed to have better grain structure than those with lower grades.

The results of these tests are shown in Table II.

TABLE II

| Example | Texture Rating | Grain Structure Rating |
|---|---|---|
| 1 | 5 | 5 |
| A | 3 | 3 |
| 2 | 5 | 4 |
| B | 3 | 4 |
| 3 | 5 | 5 |
| C | 4 | 4 |
| 4 | 5 | 4 |
| D | 3 | 4 |

The results show that with doughs containing each fat replacer, use of SBC having a particle size within the invention (Examples 1–4) yielded cookies with a texture or both texture and grain structure superior to those cookies prepared using a commercial grade powdered SBC (Comparative Examples A–D).

EXAMPLES 5–8 AND COMPARATIVE EXAMPLES E–H

The procedure of Examples 1–4 and Comparative Examples A–D was followed using the same fat replacers and in the same sequence as the latter examples, an SBC in Examples 5–8 having the same particle size distribution as that in Examples 1–4, and an SBC in Comparative Examples E–H, which was a commercial grade coarse granular SBC with a particle size distribution as previously described. The doughs of all the examples before baking had an $a_W$ in the range of 0.75–0.85. The texture and grain structure ratings of the cookies of the examples are shown in Table III.

TABLE III

| Example | Texture Rating | Grain Structure Rating |
|---|---|---|
| 5 | 5 | 3 |
| E | 3 | 3 |
| 6 | 4 | 5 |
| F | 3 | 3 |
| 7 | 6 | 5 |
| G | 4 | 3 |
| 8 | 6 | 6 |
| H | 5 | 6 |

The results of these examples show that with doughs containing each fat replacer, use of SBC having a particle size distribution within the invention (Examples 5–8) yielded cookies having a texture or both texture and grain structure superior to those of cookies prepared using a commercial grade coarse granular SBC. Thus, the texture or both texture and grain structure ratings obtained in Examples 1–8 were superior to those obtained with the same fat replacers in both Comparative Examples A–D which employed a commercial grade powdered SBC and Comparative Examples E–H, which employed a commercial grade coarse granular SBC, despite the fact that the SBC was prepared by blending the powdered SBC of Comparative Examples A–D in an amount of 25% of the blend with the coarse granular SBC of Comparative Examples E–H in an amount of 75% of the blend. The superior results of Examples 1–8 therefore indicate a true synergistic effect since such results could not have been predicted from the results obtained with each component SBC of the blend used alone, as shown in Comparative Examples A–D and E–H.

EXAMPLE 9 AND COMPARATIVE EXAMPLE I

In Example 9, the procedure of Examples 1–8 was followed except that the fat replacer was an oat maltodextrin sold as "Quaker Oatrim" by Rhone Poulenc and prepared by biochemically degrading oat flour with food grade (x)-amylase enzyme and separating the water-soluble component. The dough before baking had an $a_W$ of 0.75–0.85. The cookies had a texture grade of 4 and a grain structure grade of 4. In Comparative Example I, the procedure of Example 9 was repeated except that a commercial grade powdered SBC was employed rather than the SBC of the invention. In this case, the cookies had a texture grade of 2 and a grain structure grade of 2.

EXAMPLE 10 AND COMPARATIVE EXAMPLE J

In Example 10, the procedure of Examples 1–8 was followed except that the fat replacer was a composition sold by Kerry Ingredients as "BeaTrim Ultracreme 200" and consisted of whey protein concentrate, calcium caseinate, partially hydrogenated soybean oil, sorbitol, disodium phosphate, monoglycerides, carrageenan and sodium stearyl lactylate. The dough before baking had an $a_W$ of 0.75–0.85. The cookies had a texture grade of 4 and a grain structure grade of 5.

Substitution of a commercial grade powdered SBC in Comparative Example J, for the SBC of the invention employed in Example 10, resulted in the production of cookies having a texture grade of 3 and a grain structure grade of 3.

The results of Examples 9 and 10 and Comparative Examples I and J show that the use of SBC having the particle size distribution of this invention yielded cookies having a texture and grain structure superior to those obtained with commercial grade powdered SBC, which is the standard used in the baking industry.

EXAMPLE 11 AND COMPARATIVE EXAMPLES K AND L

The examples illustrate the preparation of reduced fat yellow cakes using a baking composition having the formula of Table IV wherein the SBC employed was either an SBC under the invention, having the same particle size distribution as in Examples 1–10 (Example 11); a commercial powdered grade SBC (Comparative Example K); or a commercial coarse granular grade SBC (Comparative Example L), as previously described. "Oatrim" oat maltodextrin,, described in Example 9, was present as a fat replacer and sodium stearyl lactylate as emulsifier.

TABLE IV

Reduced Fat Yellow Cake Formula

| Ingredient | Weight Percent |
| --- | --- |
| Cake flour | 24.07 |
| Sugar | 29.06 |
| NFDM | 1.82 |
| SBC | 0.37 |
| MCP leavening acid | 0.06 |
| SAPP 28 leavening acid | 0.43 |
| Egg white solids | 2.36 |
| Egg yolk solids | 1.19 |
| Vanilla | 0.12 |
| Shortening | 7.25 |
| Water | 30.93 |
| "Oatrim" oat maltodextrin | 1.82 |
| Sodium stearyl lactylate | 0.52 |
| | 100.00 |

The composition of each example was processed as follows: Using a 5 quart Hobart with paddle, the dry ingredients except the Oatrim were blended at speed 1 (low) for 3 minutes. One third of the water, shortening, emulsifier and Oatrim were added and the composition mixed for 1 minute at speed 1 (low) and 3 minutes at speed 2 (medium). Another third of the water was added and the composition was again mixed at speed 1 (low) for 1 minute and speed 2 (medium) for three minutes. The final third of the water was added and the composition mixed at speed 1 (low) for 2 minutes. The blended unbaked composition which had a water activity ($a_W$) of about 0.85 to 0.95, was scaled in an amount of 400 grams into a greased 8 inch cake pan and baked at 350° F. for 25 minutes.

Properties of the three cakes of the examples were determined using standard procedures of the AACC, as follows:

Volume index was determined using AACC Method 10-91.

Cell structure was determined using the scoring of AACC Method 10-90A.

Grain structure was determined using the scoring of AACC Method 10-90B.

Texture was determined using the scoring of AACC Method 10-90C.

The total Qualitative Score was determined by adding the scores of AACC Methods 10-90A, B and C.

Results are shown in Table V.

TABLE V

| Property | Ex. 11 | Comp. Ex. K | Comp. Ex. L |
| --- | --- | --- | --- |
| Volume Index | 110 | 90 | 103 |
| Cell Structure | 30 | 30 | 29 |
| Grain Structure | 16 | 16 | 15 |
| Texture | 27 | 25 | 27 |
| Qualitative Score | 73 | 71 | 71 |

EXAMPLE 12 AND COMPARATIVE EXAMPLES M AND N

These examples illustrate the preparation of reduced fat yellow cakes from baking compositions having the formula of Table VI, containing "Paselli SA-2" potato maltodextrin as employed in Example 2 as fat replacer, and wherein the SBC of Example 12 and Comparative Examples M and N correspond to that employed in Example 11 and Comparative Examples K and L respectively.

TABLE VI

Reduced Fat Yellow Cake Formula

| Ingredient | Weight Percent |
| --- | --- |
| All purpose flour | 24.19 |
| Sugar | 28.60 |
| NFDM | 2.26 |
| Salt | 0.97 |
| SBC | 0.39 |
| Eggs | 11.98 |
| Water | 24.03 |
| Vanilla | 0.24 |
| Shortening | 5.44 |
| SALP/MCP blend leavening acid | 0.39 |
| "Paselli SA-2" potato maltodextrin | 1.51 |
| | 100.00 |

The compositions were processed as follows: Using a 5 quart Hobart with paddle, all the ingredients were placed in the bowl and mixed at speed 1 (low) for 30 seconds, at speed 3 (high) for 2 minutes, at speed 2 (medium) for 2 minutes, and at speed 1 (low) for 1 minute. The blended unbaked composition, which had a water activity ($a_w$) of about 0.85 to 0.95, was scaled in an amount of 450 grams into a greased 8 inch cake pan and baked at 350° F. for 30 minutes. Properties of the resulting cakes were determined as described in Example 11 and Comparative Examples J and L, and the results are shown in Table VII.

TABLE VII

| Property | Ex. 12 | Comp. Ex. M | Comp. Ex. N |
| --- | --- | --- | --- |
| Volume Index | 102 | 93 | 102 |
| Cell Structure | 20 | 16 | 17 |
| Grain Structure | 8 | 8 | 8 |
| Texture | 28 | 28 | 26 |
| Qualitative Score | 56 | 52 | 51 |

The results shown in Table VI and VII indicate that the individual properties determined of cakes prepared using SBC having a particle size distribution within the invention (Examples 11 and 12) were as good or better than the properties obtained from cakes prepared from identical formulas except that commercial powdered or coarse granular grades of SBC were used (Comparative Examples K, L, M and N) while the Qualitative Scores of the cakes prepared with the SBC of this invention, which is a more general indication of the quality of the structure and texture of the cakes, was higher than the scores obtained when the powdered or coarse granular grades of SBC were employed.

The following examples and comparative examples illustrate the advantage in terms of the texture of baked products under the invention obtained with the use of the claimed SBC as a chemical leavening agent (employed in Examples 13–19) as compared with otherwise identical baked products using commercial powdered grade SBC as the leavener (employed in comparative examples O to T) both immediately following initial baking and after varying periods of aging. The initial texture score of the baked product immediately after baking was based on the same scoring system as stated for the previous examples, viz., with the numbers indicating the following texture qualities: 1 (wet), 3 (chewy), 5 (crumbly), and 7 (tender). However, the number descriptors for the aged products were modified as follows: 1 (hard/stale), 3 (dry), 5 (cake-like), and 7 (tender). In applying these scoring systems, higher numbered grades were deemed to indicate better quality than lower grades. In each example utilizing an SBC within the invention and corresponding comparative example utilizing a commercial powdered grade of SBC, the water activity of the dough before baking is in the range of about 0.75 to about 0.85.

EXAMPLE 13 AND COMPARATIVE EXAMPLE O

The procedures of the previous examples were followed using the formulas of Example 4 and comparative Example D, i.e., the Kansas State University cookie formula with "Simplesse" as a fat replacer. The textures of the baked cookies were initially scored immediately after baking and after aging for 5 weeks, using AACC Method 10-90, with the same scoring system as the previous examples for the cookies immediately after baking, and the modified scoring system described previously for the aged cookies. The results in terms of the numerical scores qualified by some verbal description are shown in Table VIII.

TABLE VIII

| Example | 13 | O |
|---|---|---|
| Texture Score | | |
| Initial | 4 (less chewy, crumbly) | 3 (wet/gummy/chewy) |
| 5 Week Aging | 5 (more tender, moist, crumbly) | 3 (dry) |

EXAMPLE 14 AND COMPARATIVE EXAMPLE P

The procedures followed and the baking dough used were the same as in Example 13 and Comparative Example O, respectively, except that such dough contained 5.19, rather than 5.44 wt. % of shortening and also contained 0.15 wt. % of "Durlo" emulsifier composed of mono- and diglycerides, and 0.10 wt. % of "EC-25" emulsifier composed of propylene glycol mono- and diesters of fats and fatty acids, mono- and diglycerides, partially hydrogenated soybean oil and lecithin, both emulsifiers sold by Quest International; these emulsifiers were mixed with the shortening, eggs, water and vanilla in the first mixing step at speed 2 (medium) for 1 minute. The texture scores of the cookies with accompanying verbal description immediately after baking (initial) and after 5 weeks of aging are shown in Table IX.

TABLE IX

| Example | 14 | P |
|---|---|---|
| Texture Score | | |
| Initial | 4 (slightly chewy) | 3 (chewy) |
| 5 Week Aging | 6 (very tender) | 5 (slightly tender, wet) |

EXAMPLE 15 AND COMPARATIVE EXAMPLE Q

These examples tested the effect of the two SBC's in a sugar cookie baking dough containing BeaTrim Ultracreme 200 fat replacer, such dough having the formula shown in Table X.

TABLE X

| Ingredients | Weight Percent |
|---|---|
| Cookie Flour | 38.45 |
| Granulated Sugar | 36.08 |
| Eggs | 9.95 |
| Shortening | 6.70 |
| Water | 5.13 |
| Nonfat Dry Milk | 1.22 |
| BeaTrim Ultracreme 200 | 0.81 |
| Salt | 0.59 |
| MiraThik 468 | 0.42 |
| SBC | 0.34 |
| Cream of Tartar | 0.31 |

BeaTrim Ultracreme 200 fat replacer is further identified in Example 10, while "MiraThik 468" is a modified starch sold by Staley.

In preparing the dough for baking, the sugar and shortening were mixed in the 5 quart Hobart equipped with paddle at speed 1 (low) for 1 minute; the eggs were added and the dough was mixed at speed 1 (low) for 1 minute and speed 2 (medium) for 2 minutes; and the dry ingredients and water were added and the dough mixed at speed 1 (low) for 1 minute. The dough was measured out with a #40 scoop and baked at 375° F. for 10 minutes.

Using the scoring systems described previously the texture scores of the cookies initially and after 11 weeks of aging as shown in Table XI.

TABLE XI

| Example | 15 | Q |
|---|---|---|
| Texture Score | | |
| Initial | 6 (tender, good dissolve) | 5 (crumbly, sl. dry chew) |
| 11 Week Aging | 6 (tender) | 3 (dry, tough chew) |

EXAMPLE 16 AND COMPARATIVE EXAMPLE R

These examples tested the effect of the use of SBC under the invention and commercial grade powdered SBC on a composition similar to that of the immediately preceding examples, except that the dough contained an additional emulsifier, Panodan (DATEM) sold by Grindsted and composed of diacetyl acid esters of mono- and diglycerides. The composition of the dough is shown in Table XII.

TABLE XII

| Ingredients | Weight Percent |
|---|---|
| Cookie Flour | 38.70 |
| Granulated Sugar | 36.09 |
| Eggs | 9.95 |
| Shortening | 6.22 |
| Water | 5.13 |
| Nonfat Dry Milk | 1.22 |
| BeaTrim Ultracreme 200 | 0.79 |
| Salt | 0.59 |
| MiraThik 468 | 0.41 |
| SBC | 0.34 |
| Cream of Tartar | 0.31 |
| Panodan | 0.25 |

The same procedures were used in mixing and baking the doughs of these examples as were used for Example 15 and Comparative Example Q, except that the emulsifiers were mixed with the sugar and shortening in the first mixing step at speed 1 (low) for 1 minute. The texture scores of cookies prepared from the two doughs immediately after baking (initial) and after 10 week aging are shown in Table XIII.

TABLE XIII

| Example | 16 | R |
| --- | --- | --- |
| Texture Score | | |
| Initial | 5 (crumbly) | 5 (crumbly) |
| 10 Week Aging | 6 (tender) | 4 (sl. crumbly, sl. dry) |

EXAMPLE 17 AND COMPARATIVE EXAMPLES S

The procedures and dough formula in these examples were the same as in Example 16 and Comparative Example R, except that 0.15 wt. % of Durlo and 0.10 wt. % of EC-25 emulsifiers, each further identified in Example 14 and Comparative Example P, were substituted for Panodan. The texture scores of cookies prepared from these doughs initially and after 2 week and 3 week aging, are shown in Table XIV.

TABLE XIV

| Example | 17 | S |
| --- | --- | --- |
| Texture Scores | | |
| Initial | 5 (crumbly, sl. chewy) | 4 (tough bite) |
| 2 Week Aging | 5 (sl. tender, cake-like) | 1 (very dry/hard) |
| 3 Week Aging | 5 (sl. tender, cake-like) | 1 (hard) |

EXAMPLE 18 AND COMPARATIVE EXAMPLE T

These examples illustrate the effect of the two SBC's texture scores of fat free fruit bar casings (no filling) baked from a dough containing the ingredients shown in Table XV.

TABLE XV

| Ingredients | Weight Percent |
| --- | --- |
| Part 1 | |
| Granulated Sugar | 17.783 |
| Vanilla Flavor | 0.029 |
| Corn Flour | 2.981 |
| Salt | 0.474 |
| Crystalline Fructose | 2.428 |
| High Fructose Corn Syrup | 3.407 |
| Powdered Lecithin | 1.125 |
| Part 2 | |
| SBC | 0.474 |
| ABC | 0.03 |
| Water | 17.864 |
| Part 3 | |
| Whey Protein Concentrate | 2.941 |
| Baking Powder | 0.118 |
| Oat Flour | 2.37 |
| Polydextrose | 4.433 |
| Soft Wheat Cookie Flour | 43.543 |

The dough was prepared for baking by first mixing the ingredients of Part 1 in a mixer at low speed for two minutes. Then, the SBC and a solution of the ABC (ammonium bicarbonate) in the water of Part 2 were added to the mixture of Part 1 and the composition was mixed for 6 minutes at low speed. Next, the ingredients of Part 3 were added and the composition was mixed for 4 minutes at low speed and scraped and mixed for another 4 minutes at low speed. Finally, the composition was processed through a coextruder and baked until brown.

The texture scores of the compositions initially and after 3 week aging are shown in Table XVI.

TABLE XVI

| Example | 18 | T |
| --- | --- | --- |
| Texture Score | | |
| Initial | 6 | 4 |
| 3 Week Aging | 6 | 3 |

EXAMPLE 19 AND COMPARATIVE EXAMPLE U

The baked product in these two examples is a reduced fat chocolate base cookie prepared from a dough containing the ingredients listed in Table XVII.

TABLE XVII

| Ingredients | Weight Percent |
| --- | --- |
| Part 1 | |
| Granulated Sugar | 25.19 |
| Cocoa Powder | 7.86 |
| Whey Powder | 0.46 |
| SBC | 0.65 |
| Vanilla Flavor | 0.64 |
| Part 2 | |
| Mono- and Diglycerides | 3.25 |
| Panodan | 0.22 |
| Chocolate Liqueur | 0.69 |
| High Fructose Corn Syrup | 1.73 |
| Salt | 0.78 |
| Water | 9.49 |
| Part 3 | |
| All Purpose Flour | 49.0 |
| Sodium Acid Pyrophosphate | 0.04 |

"Panodan" is Grindsted's DATEM emulsifier, further identified in Example 16 and comparative Example R.

The dough was prepared for baking by first placing the ingredients of Part 1 in an upright mixer and dry blending for 1 minute at low speed. The ingredients of Part 2 were then added and the mixture was creamed for 7 minutes at low speed. Next, the ingredients of Part 3 were added and the composition was further mixed at low speed for 6–8 minutes. Finally, the dough was processed through rotary mold equipment and baked into cookies.

The initial texture scores of the cookies prepared with each SBC and the scores after 1, 8, 20 and 26 weeks of aging are shown in Table XVIII.

TABLE XVIII

| Example | 19 | U |
|---|---|---|
| Texture Score | | |
| Initial | 7 | 7 |
| 1 Week Aging | 7 | 7 |
| 8 Week Aging | 7 | 5 |
| 20 Week Aging | 7 | 5 |
| 26 Week Aging | 6 | 3 |

The texture scores shown for the baked products of Examples 13–19 and Comparative Examples O–U, both initial and after various periods of aging, indicate that in most cases, the product prepared with an SBC under the invention has a texture superior to that of a corresponding product prepared with a commercial powdered grade SBC, and in the remaining minority of cases, the texture of the baked product prepared with an SBC under the invention is equivalent to that prepared with the commercial powdered grade SBC.

We claim:

1. A baking composition intended for the production of no fat or reduced fat chemically leavened cookies and cakes comprising flour;

shortening in an amount no more than about 15 wt. % of the unbaked composition;

at least one fat replacer, the total fat replacer being at least about 0.10 wt. % of the unbaked composition;

a total water content such that the water activity of the unbaked composition ($a_w$) at room temperature is in the range of about 0.70 to about 0.95;

and as a leavening agent, sodium bicarbonate (SBC) having a particle size distribution such that about 15 to about 50 wt. % of the particles have a particle size less than about 105 microns (U.S. Mesh Size 140) and about 30 to about 65 wt. % of the particles have a particle size greater than about 149 microns (U.S. Mesh Size 100).

2. The composition of claim 1 wherein about 20 to about 40 wt. % of the SBC particles have a particle size less than about 105 microns (U.S. Mesh Size 140) and about 48 to about 60 wt. % of the SBC particles have a particle size greater than about 149 microns (U.S. Mesh Size 100).

3. A baked product comprising the composition of claim 2.

4. The composition of claim 2 wherein about 25 to about 35 wt. % of the SBC particles have a particle size less than about 105 microns (U.S. Mesh Size 140), about 50 to about 55 wt. % of the SBS particles have a particle size greater than about 149 microns (U.S. Mesh Size 100), and about 22 to about 32 wt. % of particles have a particle size of from about 105 microns (U.S. Mesh Size 140) to about 149 microns (U.S. Mesh Size 100).

5. The composition of claim 1 wherein said sodium bicarbonate has no greater than 32 wt. % of particles with particle sizes of from about 105 microns (U.S. Mesh Size 140) to about 149 microns (U.S. Mesh Size 100).

6. A baked product comprising the composition of claim 5.

7. The composition of claim 1 wherein from about 5 to about 10 wt. % of said SBC particles are smaller than about 44 microns (U.S. Standard Sieve Series No. 325) and about 25 to about 40 wt. % of said SBC particles are larger than about 177 microns (U.S. Standard Sieve Series No. 80), with the average particle size of the SBC being in the range of from about 130 to about 170 microns.

8. A baked product comprising the composition of claim 7.

9. The composition of claim 1 wherein the fat replacer comprises a hydrolyzed starch, an undenatured, non-oxidized protein concentrate, or a pectin.

10. A baked product comprising the composition of claim 9.

11. The composition of claim 1 wherein said water activity is in the range of about 0.75 to about 0.85.

12. A baked product comprising the composition of claim 11.

13. The composition of claim 1 containing about 0.1 to about 2.0 wt. % of SBC.

14. A baked product comprising the composition of claim 13.

15. The composition of claim 1 containing about 0.10 to about 10 wt. % of said fat replacer.

16. A baked product comprising the composition of claim 15.

17. The composition of claim 1 containing about 5 to about 12 wt. % of shortening.

18. A baked product comprising the composition of claim 17.

19. A baked product comprising the composition of claim 1.

20. Sodium bicarbonate (SBC) having a particle size distribution such that about 15 to about 50 wt. % of the particles have a particle size less than about 105 microns (U.S. Mesh Size 140) and about 30 to about 65 wt. % of the particles have a particle size greater than about 149 microns (U.S. Mesh Size 100).

21. The sodium bicarbonate of claim 20 having no more than about 32 wt. % of particles with a particle size from about 105 microns (U.S. Mesh Size 140) to about 149 microns (U.S. Mesh Size 100).

22. The sodium bicarbonate (SBC) of claim 21 wherein about 20 to about 40 wt. % of the particles have a particle size less than about 105 microns (U.S. Mesh Size 140), about 48 to about 60 wt. % of the particles have a particle size greater than about 149 microns (U.S. Mesh Size 100), and about 22 to about 32 wt. % of the particles have a particle size of from about 105 microns (U.S. Mesh Size 140) to about 149 microns (U.S. Mesh Size 100).

23. The sodium bicarbonate (SBC) of claim 20 containing from about 5 to about 10 wt. % of particles smaller than about 44 microns (U.S. Standard Sieve Series No. 325) and about 25 to about 40 wt. % of particles larger than about 177 microns (U.S. Standard Sieve Series No. 80), with the average particle size of the SBC being in the range of from about 130 to about 170 microns.

* * * * *